United States Patent Office 3,465,922
Patented Sept. 9, 1969

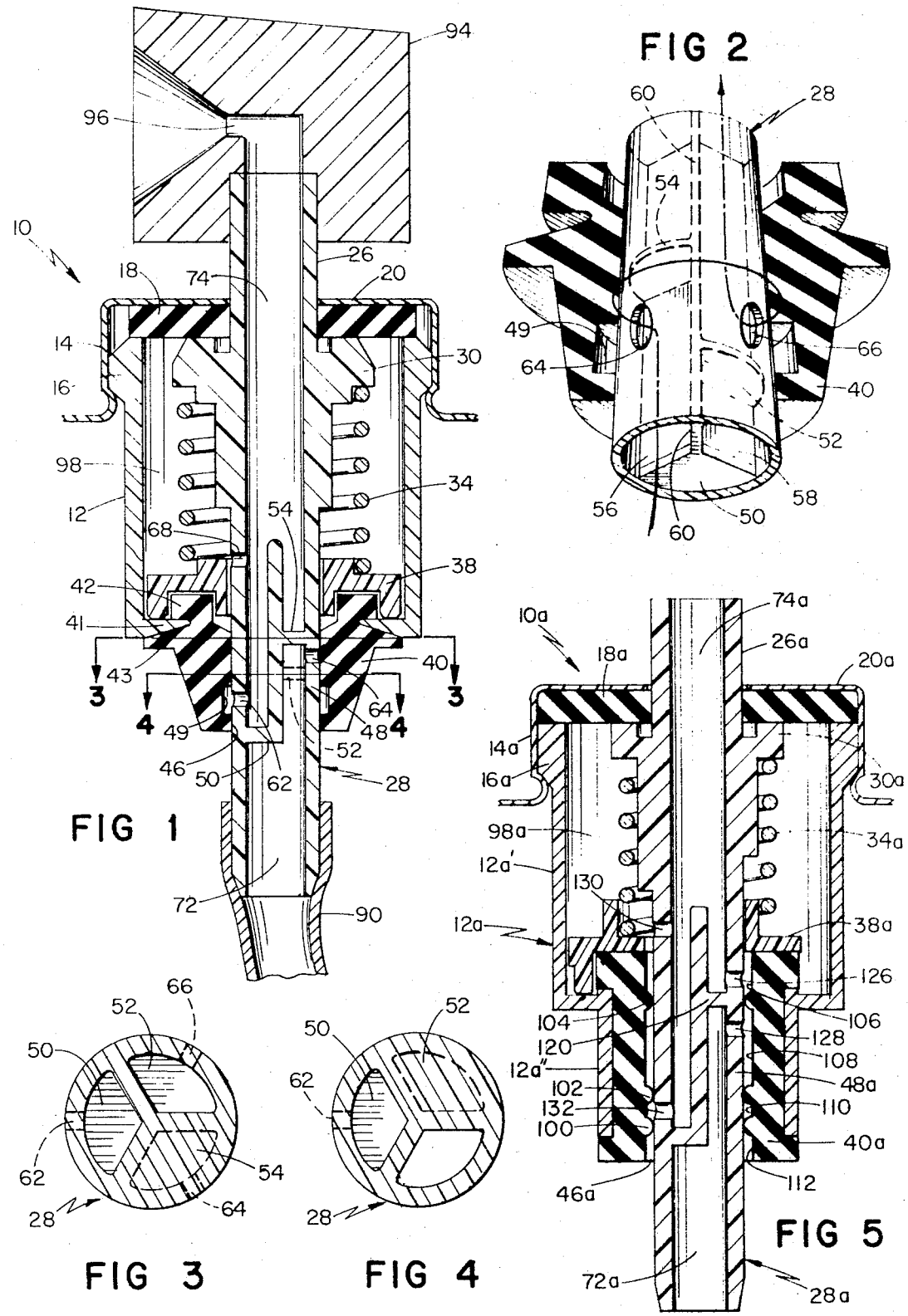

3,465,922
PRESSURIZED SPRAY DEVICE
Milo Edward Webster, Braintree, Mass., assignor to The Gillette Company, Boston, Mass., a corporation of Delaware
Filed Dec. 13, 1967, Ser. No. 690,157
Int. Cl. B65d 83/14
U.S. Cl. 222—402.18                      14 Claims

ABSTRACT OF THE DISCLOSURE

Pressurized spray device in which small amount of propellant is accumulated in auxiliary compartment during spraying, and discharges from auxiliary compartment to purge spraying orifice when valve is closed. Flow is controlled by seal surrounding stem, orifices through stem wall, and internal stem baffling.

SUMMARY OF INVENTION

Figure 6:
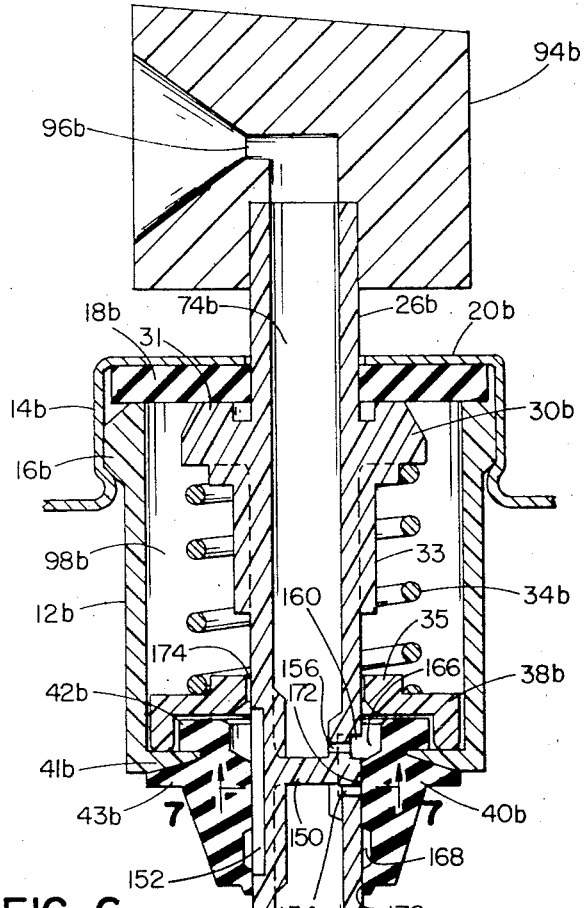

This invention relates to spray devices in which a propellant causes discharge of material to be sprayed.

A major problem associated with such spray devices is the tendency of certain materials sprayed (e.g. paints, varnishes, antiperspirants) to stick inside the narrow spraying orifice, and solidify upon contact with air after the device is used, clogging the orifice for the next use. To alleviate this problem, several devices employ a discharge of pure propellant to purge the spraying orifice after each use, this pure propellant discharge typically being obtained by moving the discharge valve to a special position (usually intermediate between the closed and spraying positions) in which pure propellant is discharged for as long as the valve remains in that position. Waste of propellant often results, and it is possible in such devices to discharge all of the propellant without discharging any of the material to be sprayed, rendering the device useless for its intended purpose.

Objects of the invention are to provide a spraying device in which the spraying orifice is automatically purged by the propellant each time the device is used, while unnecessary loss of propellant is prevented, and no special mode of operating the device is required to obtain the purge, all with a simple, reliable, long lasting, and inexpensive mechanism.

In general the invention features an auxiliary compartment in the spray container sealed from the material to be sprayed but communicating through a first flow path with the spray orifice when the movable valve stem is in its closed position, the compartment being in communication with the propellant in the container through a second flow path in at least some position of the valve stem, and a seal member for interrupting the second flow path when the valve stem is in its closed position. In preferred embodiments the seal member interrupts in all but the open position of the valve; the stem has an axially extending passage communicating with the orifice, a first opening communicating between the compartment and the passage in all positions of the stem, and a second opening communicating between the passage and the propellant when the stem is in its open position; and the seal member is a resilient member surrounding and contacting the stem.

A further feature of the structure is the arrangement in which the biasing spring is substantially completely isolated from the material in a compact and inexpensive valve assembly.

The valve assembly in a particular embodiment includes two separate valve structures, one controlling the flow of material and the other controlling the flow of propellant. Two separate channels are provided which are connected together in a common outlet passage. The auxiliary compartment is connected to the propellant channel through a port that is always open. In that embodiment the valve assembly includes a valve housing which defines the auxiliary compartment and which receives an axially movable valve stem. In the base of the valve housing is provided a synthetic rubber insert which provides a valving surface that cooperates with the valve stem. Above the insert is positioned a spring seat which receives one end of the spring which is disposed in the auxiliary compartment. The other end of the spring acts against the flange on the valve stem to urge it upwardly. The auxiliary compartment has a capacity of about 1 cc. which is sufficient to clear the discharge orifice of the spray head. Valve stem travel of about 0.090 inch fully opens both valves. The propellant port and material port are of the same dimension in the preferred embodiment although those dimensions may be varied as desired for particular applications. The arrangement positions the biasing spring (the only metallic component of the valve assembly) in the propellant auxiliary compartment so that it is not directly exposed to the material.

Figure 7:
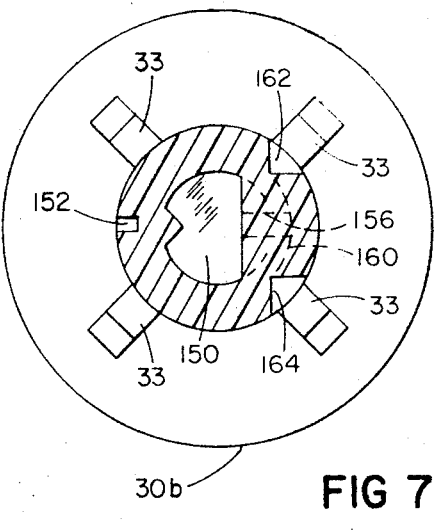
Figures 8, 9:
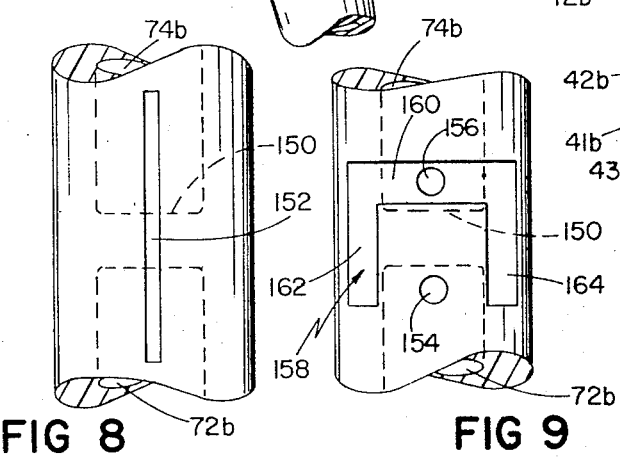
Figure 10:
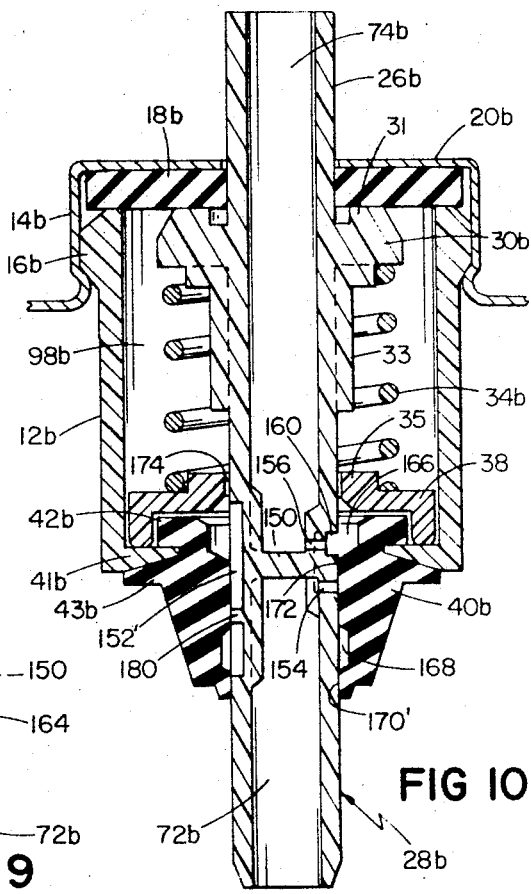

Other objects, features and advantages of the invention will be apparent from the following description of particular embodiments thereof, taken together with the drawings, in which:

FIG. 1 is a view in section of a spraying device constructed in accordance with the invention;
FIG. 2 is a fragmentary view partly in section showing a portion of the valve stem of the device of FIG. 1;
FIG. 3 is a section taken along 3—3 of FIG. 1;
FIG. 4 is a section taken along 4—4 of FIG. 1;
FIG. 5 is a view similar to FIG. 1 showing another embodiment of the invention;
FIG. 6 is a view similar to FIG. 1 showing still another embodiment of the invention;
FIG. 7 is a sectional view taken along the line 7—7 of FIG. 6;
FIGS. 8 and 9 are elevational views of the valve stem from opposite sides; and
FIG. 10 is a sectional view of a modification of the valve assembly shown in FIGS. 6–9.

DESCRIPTION OF PARTICULAR EMBODIMENTS

Referring to FIGS. 1–4, spraying assembly 10 includes stepped generally cylindrical support member 12 held inside container 14 at raised portion 16. Alignment washer 18, between the top of member 12 and the centrally apertured upper wall 20 of the container, guides the upper portion 26 of axially movable valve stem 28 under the urging of spring 34 the ends of which rest respectively against flange 30 and guide 38. Generally cylindrical sealing member 40 (of buna-N synthetic rubber) is retained at the bottom of member 12 by flange 41 which fits between shoulders 42 and 43, and provides a central passage 46 through which passes intermediate portion 48 of stem 28 (O.D. 0.153 inch). An annular recess 49 is provided in member 40 near the bottom of passage 46. Stem portion 48 has three axially spaced internal baffles 50, 52, 54, each extending over a separate 120° sector inside the stem. Vertical walls 56, 58, 60 divide the interior of stem portion 48 to prevent internal communication between the sectors adjacent baffles 50, 52, and 54. Orifices 62 (0.0145 inch diameter), 64, and 66 (each 0.02 inch diameter) are provided in the stem wall respectively above baffle 50, below baffle 54, and above baffle 52. Additional orifice 68 (0.02 inch diameter) is provided above orifice 62.

In the uppermost position of stem 28 (FIG. 1) orifice 62 is in communication with recess 49, and orifices 64 and 66 are above recess 49. In all positions of the stem orifice 68 is above member 40.

Dip tube 90 is connected to the bottom of stem 28 and reaches to the bottom of the container. Material to be sprayed is stored in the container, along with pressurized propellent, in the usual manner. Discharge button at the top of stem portion 26 provides fine spraying orifice 96.

In operation, when the stem is in the closed position of FIG. 1, member 40 prevents propellent from entering the stem through orifice 62. Material to be sprayed enters passage 72, but cannot pass through orifice 64 due to member 40. When the stem is manually depressed to its open position (FIG. 2), orifice 62 is below member 40 and allows passage of propellent up through stem passage 74. Orifices 64 and 66 are now both at recess 49, so that material to be sprayed passes out through orifice 64 and into passage 74 through orifice 66, and is discharged by propellent through spraying orifice 96. Simultaneously, some propellent leaves the stem through orifice 68 and is stored in auxiliary compartment 98 (volume about 1 cc.) between the inner wall of member 12 and the stem. When the stem is released to its closed position, flow of material and propellent from the main container is again cut off, and propellent stored in compartment 98 is automatically discharged through orifice 68, passage 74, and orifice 96 to purge the latter. With 70 p.s.i. in the main chamber of the container, compartment 98 will be charged to 50–60 p.s.i.

In the embodiment of FIG. 5, sealing member 40a is retained inside lower reduced diameter portion 12a" of member 12a. Sealing ribs 100, 102, 104 in passage 46a divide its inside wall into four axially spaced portions 106, 108, 110, 112. Portions 106 and 110 have diameters of 0.170 inch, and portions 108 and 112 have diameters of 0.185 inch. The ribs contact the valve stem to allow axial movement of the stem while preventing flow of fluid axially around the stem.

Intermediate portion 48a of the stem is internally divided by baffle 120 so that the lower passage 72a is blocked off from passage 74a. Orifices 126, 128 (each of 0.02 inch diameter) in stem portion 48a respectively above and below baffle 120 vent passages 74a and 72a to outside the stem. Additional orifices 130 (0.02 inch diameter) and 132 (0.014 inch diameter) are located on the opposite side of the stem from orifices 126 and 128 are separated from the latter by baffle 120; orifices 130 and 132 vent passage 74a to outside the stem.

In the uppermost position of stem 28a (FIG. 5) orifice 132 is between ribs 100 and 102, and rib 104 is between orifices 126 and 128. In all positions of the stem orifice 130 is above rib 104.

In operation, when the stem is in the closed position of FIG. 5, rib 100 prevents upward passage of propellent through the stem. Material to be sprayed enters passage 72a, passes out orifice 128 and is blocked from further upward passage by rib 104. When the stem is manually depressed to its open position, orifice 132 is below rib 100 and allows passage of propellent up through stem passage 74a. Orifices 126 and 128 now are between ribs 102 and 104 and therefore in communication with each other so that material to be sprayed enters stem passage 74a and is discharged by propellent through the spraying orifice. Simultaneously, some propellent leaves the stem through orifice 130 and is stored in auxiliary compartment 98a (having a volume of about 1 cc.) between the inner wall of member 12a and the stem. When the stem is released to its closed position, flow of material and propellent from the main container is cut off again, and propellent stored in compartment 98a is automatically discharged through orifice 130, passage 74a, and the spraying orifice to purge the latter. Rib 102 prevents backflow of the propellent from compartment 98a through orifices 132 and 128.

In the embodiment of FIGS. 6–9, that spraying assembly includes a pressurized container 14b which has an upper wall 20b against which is disposed a sealing washer 18b. A valve housing 12b is secured in container 14b with its upper wall against washer 18b by a flange portion 16b over which a portion of the upper wall of the container 14b is indented in securing relation. A spring seat 38b is disposed seated on the base flange 41b of housing 12b and an axially movable valve stem 26b is disposed coaxially of spring seat 38b and housing 12b. A grommet 40b is secured on flange 41b of housing 12b to seal the lower end thereof.

Stem 26b has a flange 30b having a rib 31 that is urged upwardly into sealing relation with washer 18b by spring 34b which acts between spring seat 38b and the lower surface of flange 30b. Also formed on stem 26b below flange 30b are a set of four axially extending stop members 33 which engage the upstanding hub portion 35 of spring seat 38b to limit the permitted axial travel of valve stem 26b.

The upper portion of valve stem 26b has an axially extending discharge passage 74b which communicates with a suitable valve cap 94b having a discharge orifice 96b therein; and the lower portion of the valve stem (below grommet 40b) defines a material entry passage 72b which communicates through dip tube 90b with the material in the bottom of the container 14b. A barrier 150 separates the two passages 72b and 74b of the valve stem.

The valve stem includes an axially extending slot 152 (indicated in FIG. 8), 0.250 inch in length, 0.010 inch wide, and 0.0165 inch deep. Opposite slot 152 is a supply orifice 154 that extends through the wall of supply passage 72b and a discharge orifice 156 that extends through the wall of discharge passage 74b. Each orifice 154, 156 is 0.020 inch in diameter. A material flow channel 158 of inverted U configuration as best indicated in FIG. 9 has a horizontal section 160, 0.040 inch wide, 0.030 inch deep and 0.065 inch long. Connected at either end of passageway 160 are vertical passages 162, 164, each of which 0.110 inch long and of generally triangular configuration 0.030 inch wide and 0.030 inch deep as best indicated in FIG. 7.

Grommet 40b has an annular chamber 166 formed at its upper end and an annular chamber 168 of toroidal configuration define a space 0.010 inch wide and 0.040 inch long with tapered ends adjacent its lower end as best indicated in FIG. 6. Below chamber 168 is a lip 170, 0.030 inch long.

In operation, when the valve assembly is in the closed position as shown in FIG. 6, slot 152 is sealed from propellent from the upper portion of the container by grommet lip 170. The material in the container to be dispensed is applied through dip tube 90b and supply passage 72b to port orifice 154 where it is blocked by the wall portion 112 of grommet 40b. The auxiliary chamber 98b is in communication with the discharge passage 74b through the clearance passage between spring seat 38b and the stem to annular recess 166 and through port orifice 156.

When stem 26b is depressed, the lower end of slot 152 moves past lip 170 and communicates with propellent in the upper end of the container. As soon as the lower end of slot 152 is exposed, the propellent flows through slot 152 into chamber or recess 166 through passage 174 to charge the auxiliary chamber 98b. It will be noted that the dimensions of horizontal passage 160 and the upper end of grommet sealing wall 172 are proportioned relative to the length of grommet lip 170 so that port 156 is sealed from recess 166 as the slot 152 is opened to the propellent. On further movement downward of stem 26b supply orifice 154 and vertical passages 162 and 164 become exposed to annular chamber 168. At this time a flow passage for material from passage 72b is completed through orifice 154, annular recess 168, vertical passages 162 and 164, horizontal passage 160, and orifice 156 to discharge passage 74b. At the same time propellent is passed from the upper portion of the container through slot 152 to annular chamber 168 and through the same passage as above to the discharge passageway in a vapor tap operation. Thus material and propellent in appropriate mixture as determined by the dimensions of the orifices 154, 156 and slot 152 is dispensed from the container. The position for dispensing is established by the stop provided by the ribs 33 contacting hub 35 of spring seat 38b.

When the stem 26b is released, spring 34b returns it to its closed position (as shown in FIG. 6) and flow of material and propellent through passages 162, 164 and through port 154 is terminated. After port 154 is closed a discharge path for the auxiliary chamber 98b is provided by the upper wall of passage 160 as it rises above the sealing portion 172 of the grommet and in this position the propellent that has been stored in the auxiliary chamber can flow through channel 174 and chamber 166 to port 156 for discharge through passageway 74b and the orifice of the nozzle to purge that orifice and remove any accumulated material from that nozzle orifice in a cleaning operation.

It will be seen that if the annular passage 168 is interrupted and a sealing wall provided at the location of slot 152, that slot would function as a passage for charging the auxiliary chamber 98b with propellent but would eliminate the vapor tap feature of the embodiment shown in FIGS. 6–9. In another modification, as indicated in FIG. 10, a barrier 180 could be provided in slot 152', which barrier would be bypassed for charging chamber 98b when projection 180 was aligned with annular chamber 168 but would close off slot 152' when the valve stem was fully depressed as the barrier would be aligned with grommet lip 170' in sealing relation.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention as defined in the claims.

What is claimed is:

1. In a spray device having a container for storing material to be sprayed and propellent, a valve assembly including a movable valve stem, a first flow path communicating between said material and a small spraying orifice outside the container, said valve stem having at least a closed position in which said material is prevented from reaching said orifice and an open position in which said material is forced by said propellent along said first path to said orifice, that improvement comprising:
   an auxiliary compartment in said container sealed from said material but communicating with said orifice when said stem is in its closed position, said compartment being in communication, along a second flow path separate from said first path, with said propellent in at least some position of said valve stem, and
   a seal member for preventing communication between said propellent and said compartment by interrupting said second path when said valve stem is in said closed position, said stem having an axially extending passage communicating with said orifice, a first opening communicating between said compartment and said passage in all positions of said stem, and a second opening communicating between said passage and said propellent when said stem is in said open position.

2. The device of claim 1 wherein said seal member is a resilient member surrounding and contacting said stem to thereby prevent passage of propellent axially of said stem across the zone of contact between said member and stem.

3. The device of claim 2 wherein said seal member has an annular recess adjacent said stem, said stem has internal baffling defining upper and lower passage portions, said stem has third and fourth orifices located respectively on opposite sides of said baffling, said third and fourth openings communicating with each other outside said stem through said annular recess when said stem is in said open position, at least one of said third and fourth openings being out of communication with said annular recess when said stem is in said closed position.

4. The device of claim 2 wherein said resilient member has a plurality of spaced sealing ribs and said stem contacts said member exclusively at said ribs.

5. The device of claim 4 wherein said second opening is located between a pair of said ribs when said stem is in said closed position.

6. In a spray device having a container for storing material to be sprayed and propellent, a valve assembly including a movable valve stem, a first flow path communicating between said material and a small spraying orifice outside the container, said valve stem having at least a closed position in which said material is prevented from reaching said orifice and an open position in which material is forced by said propellent along said first path to said orifice, said stem defining upper and lower passage portions, said lower portion communicating through a dip tube with the material to be sprayed and with a first opening through the wall of said stem, said upper portion communicating with said spraying orifice and with a passage in said stem wall defining a part of a second flow path separate from said first path and communicating with said compartment,
   a generally cylindrical member having an enlarged portion defining an auxiliary compartment in said container sealed from said material but communicating with said orifice when said stem is in its closed position, and a second portion adapted to support a seal member, said compartment being in communication, along said second flow path separate from said first path, with said propellent in at least some position of said valve stem, and
   a seal member secured on said second portion of said cylindrical member, said seal member comprising a resilient member having a first sealing surface contacting said stem between said first and second passage portions when said stem is in said closed position, and a second sealing surface contacting said stem and blocking said second flow path when said stem is in said closed position for preventing communication between said propellent and said compartment by interrupting said second path when said valve stem is in said closed position.

7. The device of claim 6 wherein said passage is an axially extending groove in one wall of said stem.

8. The device as claimed in claim 6 wherein said passage includes two openings through said stem wall.

9. The device as claimed in claim 6 where said first and second flow paths are in communication with said spraying orifice in at least some position of said valve stem.

10. A dispensing device comprising a container for storing a material to be dispensed and a propellent,
   a nozzle through which said material is to be dispensed, an auxiliary chamber, a first passage connecting said container and said auxiliary chamber, a second passage connecting said auxiliary chamber and said nozzle, and a valve assembly for controlling flow of material through said first and second passages, said valve assembly including first and second valve surfaces in said passages, and an axially movable valve stem mounted for sliding movement past said first and second valve surfaces and including third and fourth valve surfaces adapted to cooperate with said first and second valve surfaces respectively, said valve stem having an axially extending groove in one wall thereof and being movable between a first position in which said first passage is closed and said second passage is open and a second position in which the end of said groove moves past its cooperating valve surface for opening said first passage.

11. The dispensing device as claimed in claim 10 wherein said stem is a tubular member and includes a barrier member intermediate its upper and lower ends, a first port on one side of said barrier member and a second port on the other side of said barrier member, the lower portion of said stem communicating with said container and the upper end of said stem communicating with said nozzle.

12. The dispensing device as claimed in claim 11 wherein one of said passages includes a bifurcated groove in the wall of said stem, said groove having two spaced depending leg portions, one of said ports being located between said spaced leg portions.

13. A dispensing device comprising a container for storing a material to be dispensed and a propellant,
a nozzle through which said material is to be dispensed, an auxiliary chamber, a first passage connecting said container and said auxiliary chamber, a second passage connecting said auxiliary chamber and said nozzle, and a third passage connecting said container and said nozzle, and a valve assembly for controlling flow of material through said first and second passages, said valve assembly including a seal member having first, second and third valve surfaces in said passages, and an axially movable valve stem extending through said seal member and mounted for sliding movement past said first, second and third valve surfaces and including fourth and fifth valve surfaces adapted to cooperate with said first and second valve surfaces respectively, said valve stem being movable between a first position in which said first passage is closed and said second passage is open and a second position in which said first passage is open.

14. The dispensing device as claimed in claim 13 wherein said first passage is exposed to propellant in said container, said third passage is exposed to said material in said container and said first and third passages are connected to said second passage when said valve stem is in said second position.

References Cited

UNITED STATES PATENTS

| | | | |
|---|---|---|---|
| 2,998,168 | 8/1961 | Waldherr | 222—402.16 X |
| 3,180,535 | 4/1965 | Ward | 222—402.2 X |
| 3,187,953 | 6/1965 | Ferguson | 222—402.24 X |
| 3,341,082 | 9/1967 | Meshberg | 222—402.2 X |
| 3,351,247 | 11/1967 | Frangos | 222—148 X |

SAMUEL F. COLEMAN, Primary Examiner